United States Patent [19]

Cerullo

[11] Patent Number: 5,305,545
[45] Date of Patent: Apr. 26, 1994

[54] ELECTROMECHANICAL DEVICE FOR THE CONTINUOUS TRAPPING OF PESTS

[76] Inventor: Mariano Cerullo, Via Braccianese 672 00060 S.Maria di Galeria, Rome, Italy

[21] Appl. No.: 838,226
[22] PCT Filed: Jul. 1, 1991
[86] PCT No.: PCT/IT91/00053
  § 371 Date: Mar. 2, 1992
  § 102(e) Date: Mar. 2, 1992
[87] PCT Pub. No.: WO92/00671
  PCT Pub. Date: Jan. 23, 1992

[30] Foreign Application Priority Data

Jul. 6, 1990 [IT] Italy .................. 48125A90

[51] Int. Cl.⁵ ............................ A01M 23/10
[52] U.S. Cl. ............................ 43/72; 43/74
[58] Field of Search ............ 43/72, 71, 73, 74, 64, 43/69; 232/60, 61, 57, 47

[56] References Cited

U.S. PATENT DOCUMENTS

| | | | |
|---|---|---|---|
| 125,290 | 4/1872 | Harnish | 43/74 |
| 546,918 | 9/1895 | Dietz | 43/72 |
| 1,131,306 | 3/1915 | Wright . | |
| 1,244,069 | 10/1917 | Neuneker . | |
| 1,384,698 | 7/1921 | Kalemba | 43/74 |
| 1,752,041 | 3/1930 | Trumbo | 43/70 |
| 2,110,678 | 3/1938 | Robbins . | |
| 2,221,406 | 11/1940 | Paiuk . | |
| 3,778,923 | 12/1973 | Cuoco | 43/69 |
| 4,145,834 | 3/1979 | Quigley | 43/73 |
| 4,241,531 | 12/1980 | Nelson et al. | 43/69 |
| 4,553,349 | 11/1985 | Tsai | 43/70 |

FOREIGN PATENT DOCUMENTS 682273 10/1939 Fed. Rep. of Germany .
2152350 8/1985 United Kingdom .

*Primary Examiner*—Paula A. Bradley
*Assistant Examiner*—Chuck Y. Mah
*Attorney, Agent, or Firm*—Watson, Cole, Grindle & Watson

[57] ABSTRACT

An air-tight vermin trap includes a lower section containing a disinfectant liquid, an upper section sealingly mounted on the lower section and a cover sealingly covering the upper section. The upper section defines an entrance opening having a cover flap which can sealingly close the entrance opening. A drop floor which is activated by an electromechanical system operates to drop a vermin into the lower section upon actuation of a sensor flap by the vermin. Vermin access elements extend upwardly along the lower section and the upper section to the entrance body.

6 Claims, 3 Drawing Sheets

ELECTROMECHANICAL DEVICE FOR THE CONTINUOUS TRAPPING OF PESTS

SUMMARY OF THE INVENTION

The purpose of the present invention, whose working is described in greater detail below, is to allow the continuous trapping of, in particular but not exclusively, mice and rats. One of the distinctive characteristics of this system is that it can trap the animals in rapid succession, and automatically reactivates itself in some tenths of a second and has an autonomy in the order of a hundred consecutive trappings.

The device, which has undergone long trials, has demonstrated an exceptional efficiency in practice, even in areas with large populations of mice or rats, where the traces of these animals, present in large numbers, become very rare or even completely disappear after the device has been installed.

In the light of these results, there are good reasons for considering that the invention in question, suitably used, can provide a concrete remedy to deal with the proliferation of mice and rats It which has become a considerable ecological problem for the countryside and cities.

This is the result of decades of field research and studies on the hetelogy of these species expertly carried out in environments suited to the case.

Further characteristics and advantages of the invention will be understood by reference to the attached drawings, which depict electromechanical device for the continuous trapping, in particular but not exclusively, of mice and rats, as an mere example and not restrictive with regard to its use, with the aid of the various figures and plans appended.

DETAILED DESCRIPTION OF THE PREFERRED EMBODIMENT

With particular reference to the numerical symbols of the above Figures, the device comprises two movable sections, flush-mounted on top of each other, whose form and dimensions change according to the species to be trapped.

Figure 1:
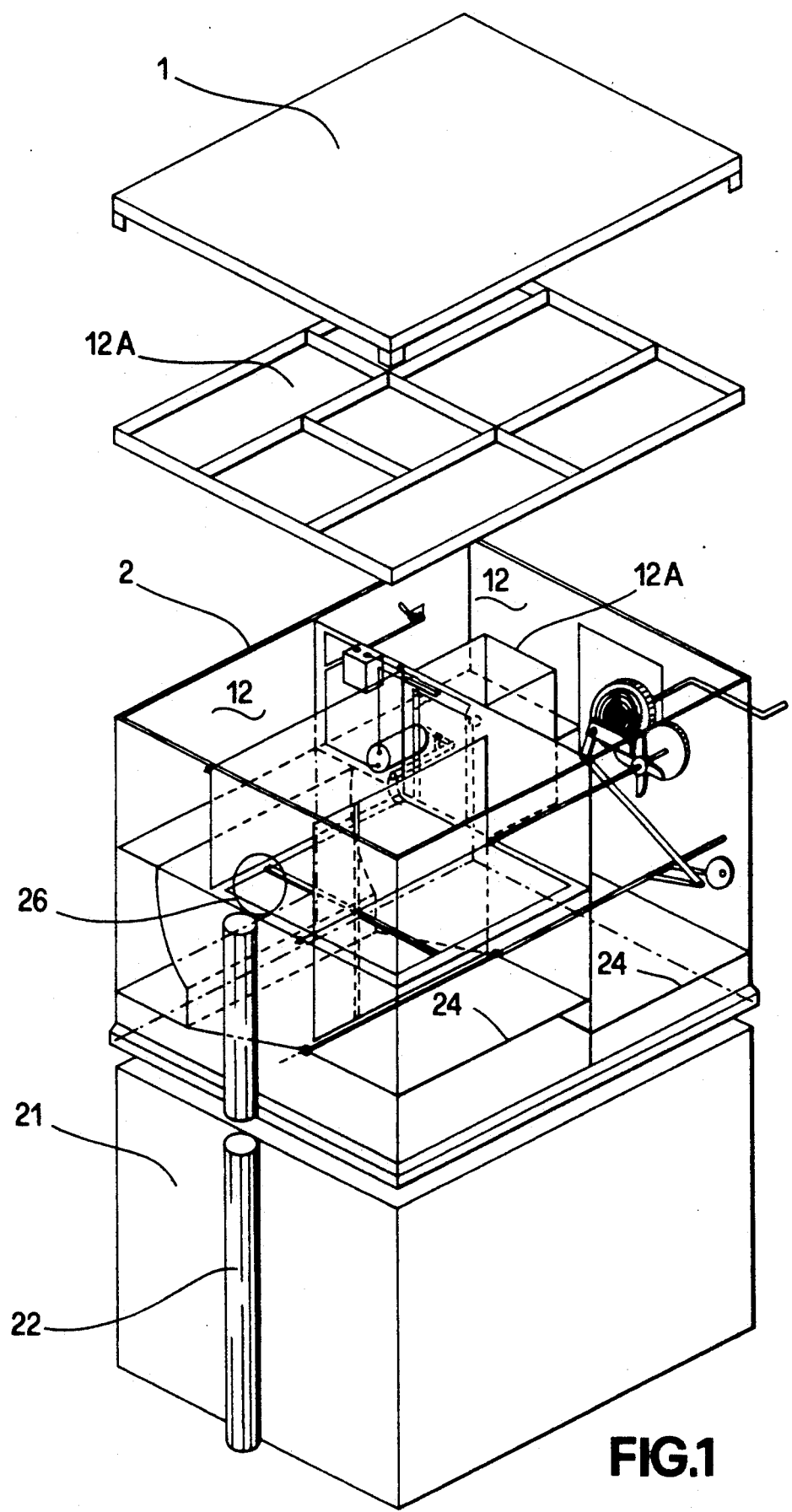
FIG. 1 shows a perspective view of all the parts which comprise the invention.

As shown in FIG. 1, the upper section 2 (1) is divided into compartment 12 which house the trapping electromechanisms and the food troughs 12A. These sections have a removable flush-mounted cover 1 with or without sloping and a base 24 which seals the lower section 21 at the moment of overlap.

The lower section 21 is a sealed container for collecting the trapped prey.

Figure 2:
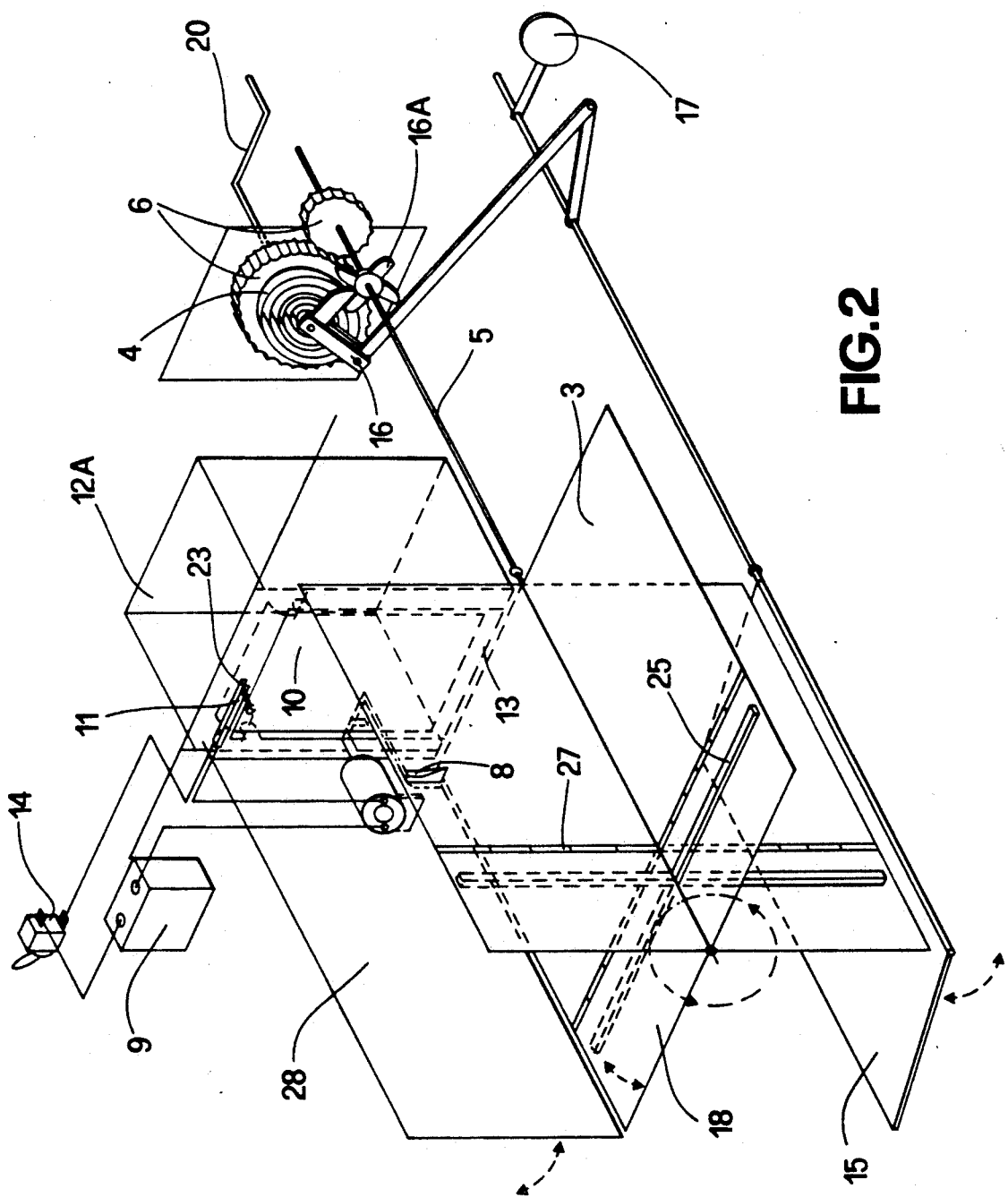
FIG. 2 shows all the mechanical and electromechanical parts of the invention.
Figure 4:
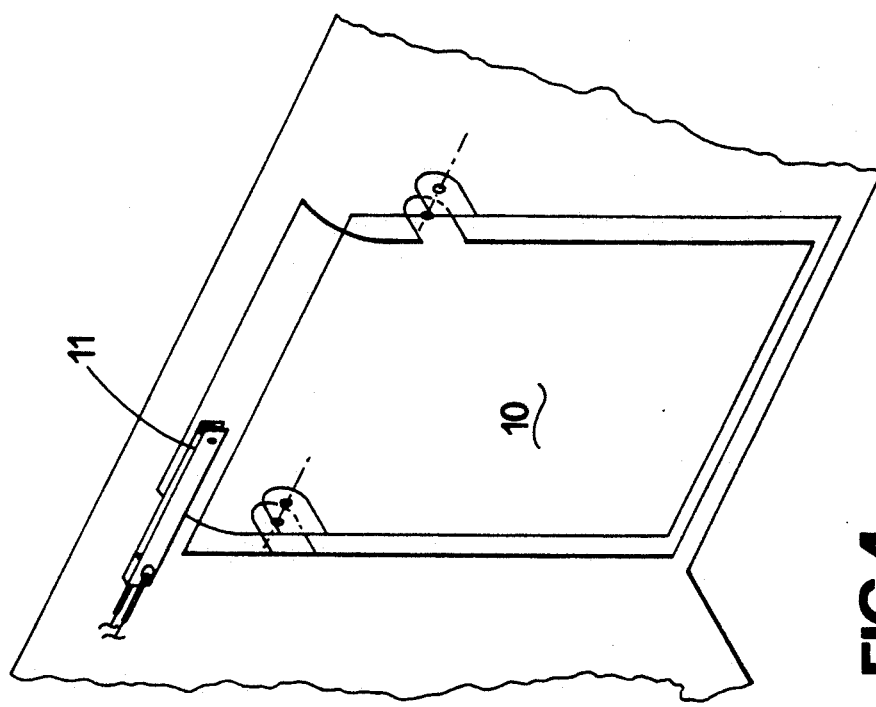
FIG. 4 gives a schematic representation of the rocker flap which is pivoted at the centre and positioned at the moment of the triggering of the trapping maneuver.
Figure 3:
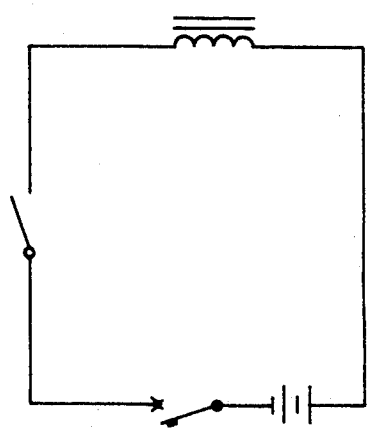
FIG. 3 shows the basic electrical diagram.

The parts comprising the device are: four rectangular planes 3 (FIG. 2) at 90° to each other which rotate on a carrying axle 5 which in turn, during the rotation, occupy the horizontal position of the current "trap area" aligned with the entrance flap 26 (see FIG. 1) on the one side and the small window 10 (see FIGS. 2 and 4), the sole access to the food trough compartment, on the other side; for trapping those animals which have difficulty in entering holes or narrow passages without an exit at the other end, these trapping areas should be as long as the length of the device (that is to say, passes from one side to the other of the invention) so that the animal can see or sense with ultrasounds, as is the case with rats, an exit at the other end. In this case, the trapping mechanisms are located laterally, with the contacts which trigger the trapping placed halfway along the corridor; for trapping rats and other similar species which have a long tail, the part of the trap areas near to the entrance flap 26 is equipped with a hinged section 18 which can move upwardly to allow the animal's tail to slide freely when it falls into the container below, even after the successive trapping plane has reached the appropriate horizontal position to become the current trapping area.

This section, during the rotation of the planes, is held against the flap support 25 by a returning spring situated at the centre of the hinge 27 of the section itself;

to avoid the tails of the animals preventing the rotation of the trapping areas during the trapping phase (only in the version for the trapping of the animals), the lower part of the wall 28 which forms the trapping area can also move outwardly.

A spring 4 (see FIG. 2) triggers the mechanical torque with the carrying axle 5 via two cogged gears 6. This spring is capable of impressing a uniform torque for hundreds of consecutive trappings.

A "sucker solenoid" 7 with pin 8 activated by the breaker 14 for releasing the trapping area in,the trapping phase. The pin 8 is equipped with a returning spring which immediately repositions it to block the successive trapping area. The unblocking and blocking operations allows the rotation of 90° in 90°;

an ordinary battery 9 supplies energy for thousands of electrical impulses from the trapping trigger to the sucker solenoid 7;

an electrical contact 11 (4), which closes the battery-solenoide circuit, during the trapping phase;

a screw 23 which regulates the sensitivity of the contacts;

a sensitive rocker flap 10, pivoted at the centre, located in the food compartment such that the lower part partially obstructs the small window 13 (4), the sole access to the food trough, while the upper part is set up to close the electrical contact 11 as soon as the animal, in an attempt to push its nuzzle in the small window, inevitably touches the lower part.

This rocker flap positioned before the small window of the food compartment has proven to be exceptionally reliable for trapping young mice and rats, such that they have been totally eliminated in some very populated zones, while for trapping some old rats it was necessary not only to lengthen the trapping areas making them pass from one side to the other of the deviqe, to guarantee the trapping contact, but also to position the rocker flap on the edge of the food trough giving it the appropriate form to capture those of them with exceptional instincts which tended to sniff the bait but not touch it, in order to ensure the contact which triggers the trapping mechanism one can also employ contacts triggered by a rocker board or infallible photoelectric cell systems. In this manner, the animal, even if it only went to sniff the food, something which, fortunately, it cannot resist doing, would trigger its own capture.

A breaker 14 to manually activates or shuts off the electric circuit which triggers the trapping phase;

a small crank 20 to rewind the spring 4. The rewind mechanism is similar to that found in old alarm clocks;

a board 22 divided into two segments which allows the animal easy access up to the entrance flap 26;

an 'discharge' flap 15 located on the floor 24 of the upper section 2 above the current trapping area. This flap slopes 15° towards its base: it is opened by a system of levers 16 controlled by cams 16A placed on the carrying axle 5 in synchrony with the triggering of the trapping operation and the unloading into the underlying container 21 of the animal which has been trapped and sealed there immediately afterwards by a returning counterd. weight 17.

The sealed container 21 underneath is partially filled with water, to which a disinfectant can be added, for example a suitable dose of a substance similar to that used in caravan toilets. In addition, this substance largely neutrailizes the smells which are issued when the discharge flap opens so as to avoid raising any suspicions in animals with a good sense of smell and to make the operation of cleaning out the trapped animals easier if they have been left in the container for several days.

I claim:

1. An electromechanical vermin trap which comprises:

a housing that includes a lower section for disinfectant liquid and an upper section sealingly mounted on the lower section, said upper section being upwardly open and defining a front end having an entrance opening with a movable closure flap which can sealingly close the entrance opening and a rear end, said upper section containing a sensor means near said rear end, a drop floor means between said entrance opening and said sensor means, electromechanical means for causing said drop floor means to operate to drop a vermin thereon downwardly towards said lower section upon a signal from said sensor means due to vermin activation, tray means for food positioned on an opposite side of said drop floor means from said entrance opening, and a hinged discharge flap below aid drop floor means which moves downwardly to allow a vermin dropping downwardly from said drop floor means to drop into said lower section of said housing, cover means which sealingly covers said upper section of said housing, and external vermin access means which extends upwardly along said lower section and said upper section to said entrance opening.

2. The electromechanical vermin trap according to claim 1, wherein said drop floor means comprises four plate means which are attached along edges thereof to a rotatable axle so as to extend at 90° angles relative to one another.

3. The electromechanical vermin trap according to claim 2, wherein each of said four plates includes a main portion and a minor portion adjacent said entrance opening which is hinged to said main portion, said minor portion being rotatable relative to said main portion.

4. The electromechanical vermin trap according to claim 2, wherein said sensor means comprises a rotatable actuator flap and wherein said electromechanical means includes an electrical switch which is closed when a vermin contacts said rotatable actuator flap.

5. The electromechanical vermin trap according to claim 4, wherein said electromechanical means includes a spring means connected to said axle to rotate said axle and move said plate means attached thereto, a pin means for contacting said plate means and preventing rotation of said axle, and a solenoid for moving said pin to thereby enable said axle to rotate one quarter turn.

6. The electromechanical vermin trap according to claim 4, wherein said upper section of said housing includes wall means between said drop floor means and said tray means for food, said wall means providing a window and wherein said rotatable actuator flap is positioned in front of said window.

* * * * *